US011251595B2

United States Patent
Holder et al.

(10) Patent No.: US 11,251,595 B2
(45) Date of Patent: Feb. 15, 2022

(54) LIGHTNING PROTECTION SYSTEM AND METHOD

(71) Applicant: ERICO INTERNATIONAL CORPORATION, Solon, OH (US)

(72) Inventors: Gregory Dean Holder, Chagrin Falls, OH (US); Thomas Edward Bendlak, Macedonia, OH (US)

(73) Assignee: ERICO International Corporation, Solon, OH (US)

( * ) Notice: Subject to any disclaimer, the term of this patent is extended or adjusted under 35 U.S.C. 154(b) by 371 days.

(21) Appl. No.: 16/459,750

(22) Filed: Jul. 2, 2019

(65) Prior Publication Data
US 2020/0011515 A1 Jan. 9, 2020

Related U.S. Application Data

(60) Provisional application No. 62/693,580, filed on Jul. 3, 2018.

(51) Int. Cl.
*H02G 13/00* (2006.01)
*H01R 4/48* (2006.01)
(Continued)

(52) U.S. Cl.
CPC .............. *H02G 13/80* (2013.01); *G09G 3/006* (2013.01); *H02H 1/04* (2013.01); *H02H 3/22* (2013.01);
(Continued)

(58) Field of Classification Search
CPC ........ H02G 13/00; H02G 13/80; H02G 13/40; H02H 1/04; H02H 3/22; H01R 4/489;
(Continued)

(56) References Cited

U.S. PATENT DOCUMENTS 2,334,218 A    11/1943   Roloson
2,964,727 A *   12/1960   Hebeler ................. H01R 4/489
                                             439/729
(Continued)

FOREIGN PATENT DOCUMENTS

CN          101133538 A      2/2008
DE          10233528 B4      5/2004
(Continued)

OTHER PUBLICATIONS

Isolated Downconductor Upper Termination Kit instruction sheet; ERICO International Corporation copyright 2007, 2011; 6 pages.
(Continued)

*Primary Examiner* — Angel R Estrada
(74) *Attorney, Agent, or Firm* — Quarles & Brady LLP

(57) ABSTRACT

An equipotential bonding system can be provided for a lightning protection system that includes a mast assembly with an internal passageway that includes an internal surface, and a conductor that extends through the internal passageway. The equipotential bonding system can include a deflection member that is disposed at least partly within the internal passageway. The deflection member can be configured to urge the conductor into contact with the internal surface to form a conductive pathway between the mast assembly and the conductor.

19 Claims, 7 Drawing Sheets

(51) Int. Cl.
*H01R 4/64* (2006.01)
*G09G 3/00* (2006.01)
*H02H 3/22* (2006.01)
*H02H 1/04* (2006.01)
*F21S 8/08* (2006.01)

(52) U.S. Cl.
CPC ............... *F21S 8/086* (2013.01); *H01R 4/489* (2013.01); *H01R 4/643* (2013.01)

(58) Field of Classification Search
CPC .. H01R 4/643; H01R 4/64; F21S 8/086; F21S 8/088; F21S 8/00; F21V 23/00; F21V 23/002; H05B 37/02; G09G 3/006
USPC .... 174/2, 3, 5 R, 5 SB, 5 SG, 6, 7, 51, 68.1, 174/68.3; 439/100, 95, 98, 97; 361/212, 361/219, 222
See application file for complete search history.

(56) References Cited

U.S. PATENT DOCUMENTS

| | | | |
|---|---|---|---|
| 3,009,982 A | 11/1961 | Newman | |
| 3,226,593 A | 12/1965 | Pittman | |
| 3,353,145 A * | 11/1967 | Sodderland | H01R 4/643 439/795 |
| 3,654,520 A | 4/1972 | Graneau | |
| 3,716,649 A * | 2/1973 | Smith | H01R 4/66 174/7 |
| 4,026,619 A * | 5/1977 | Gillemot | H01R 4/646 174/51 |
| 4,056,679 A | 11/1977 | Brandt et al. | |
| 4,480,146 A | 10/1984 | Invernizzi | |
| 4,760,213 A | 7/1988 | Gumley | |
| 5,364,281 A * | 11/1994 | Leto | H01R 4/60 439/100 |
| 5,594,613 A | 1/1997 | Woodworth et al. | |
| 5,616,036 A * | 4/1997 | Polidori | H01R 4/60 439/100 |
| 5,708,555 A | 1/1998 | Woodworth et al. | |
| 5,831,808 A | 11/1998 | Girard | |
| 5,969,291 A | 10/1999 | Bertazzi et al. | |
| 6,320,119 B1 | 11/2001 | Gumley | |
| 6,398,596 B1* | 6/2002 | Malin | H01R 4/42 174/78 |
| 6,875,915 B1 | 4/2005 | Chung | |
| 7,888,024 B2 | 2/2011 | Hosono et al. | |
| 8,446,703 B2 | 5/2013 | Klaube et al. | |
| 9,543,741 B1* | 1/2017 | Pittman | H02B 3/00 |

FOREIGN PATENT DOCUMENTS

| | | |
|---|---|---|
| DE | 102005041167 A1 | 3/2007 |
| EP | 0539351 A1 | 4/1993 |
| EP | 0665440 A1 | 8/1995 |
| GB | 1221651 A | 3/1971 |
| JP | H05299154 A | 11/1993 |
| JP | 2008152927 A | 7/2008 |
| WO | 2008026766 A1 | 3/2008 |
| WO | 2014063869 A1 | 4/2014 |
| WO | 2014063870 A1 | 5/2014 |

OTHER PUBLICATIONS

Eritech System 3000 Installation, Operation and Maintenance Manual; copyright 2009, 2012 ERICO International Corporation; 68 pages.

* cited by examiner

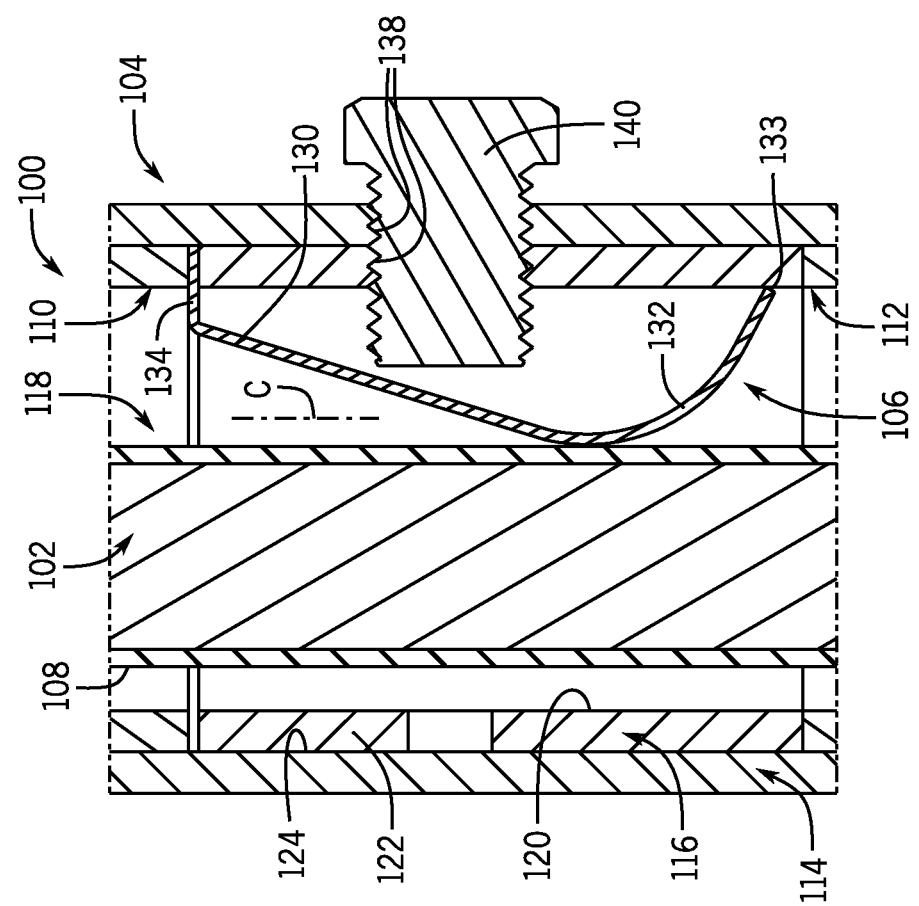
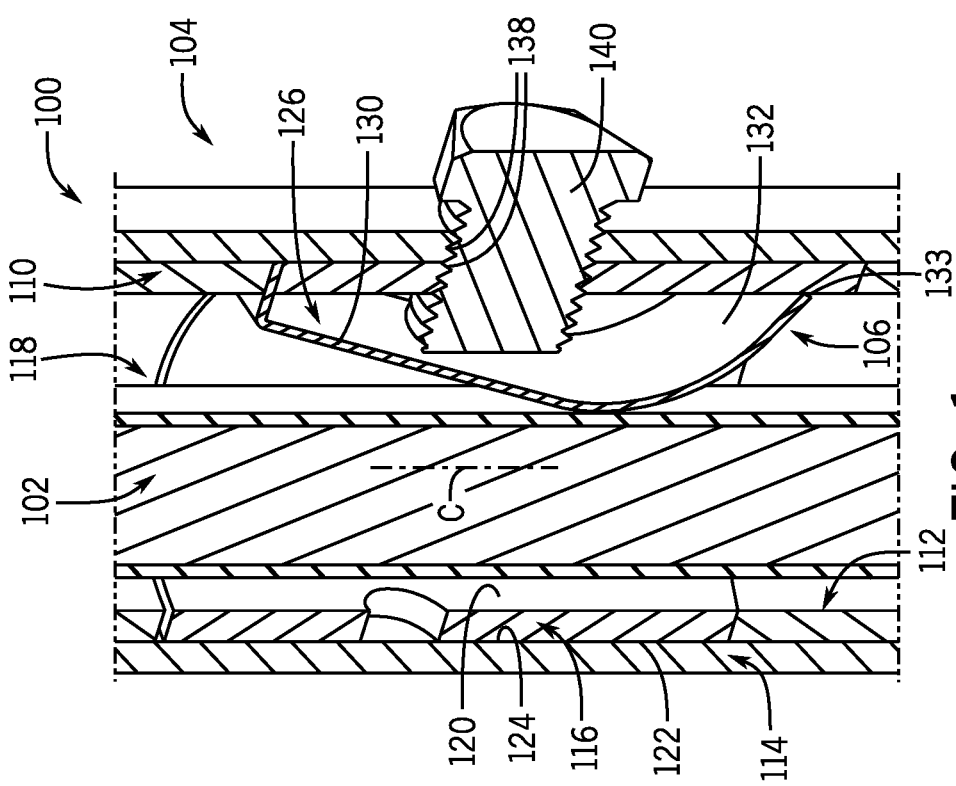

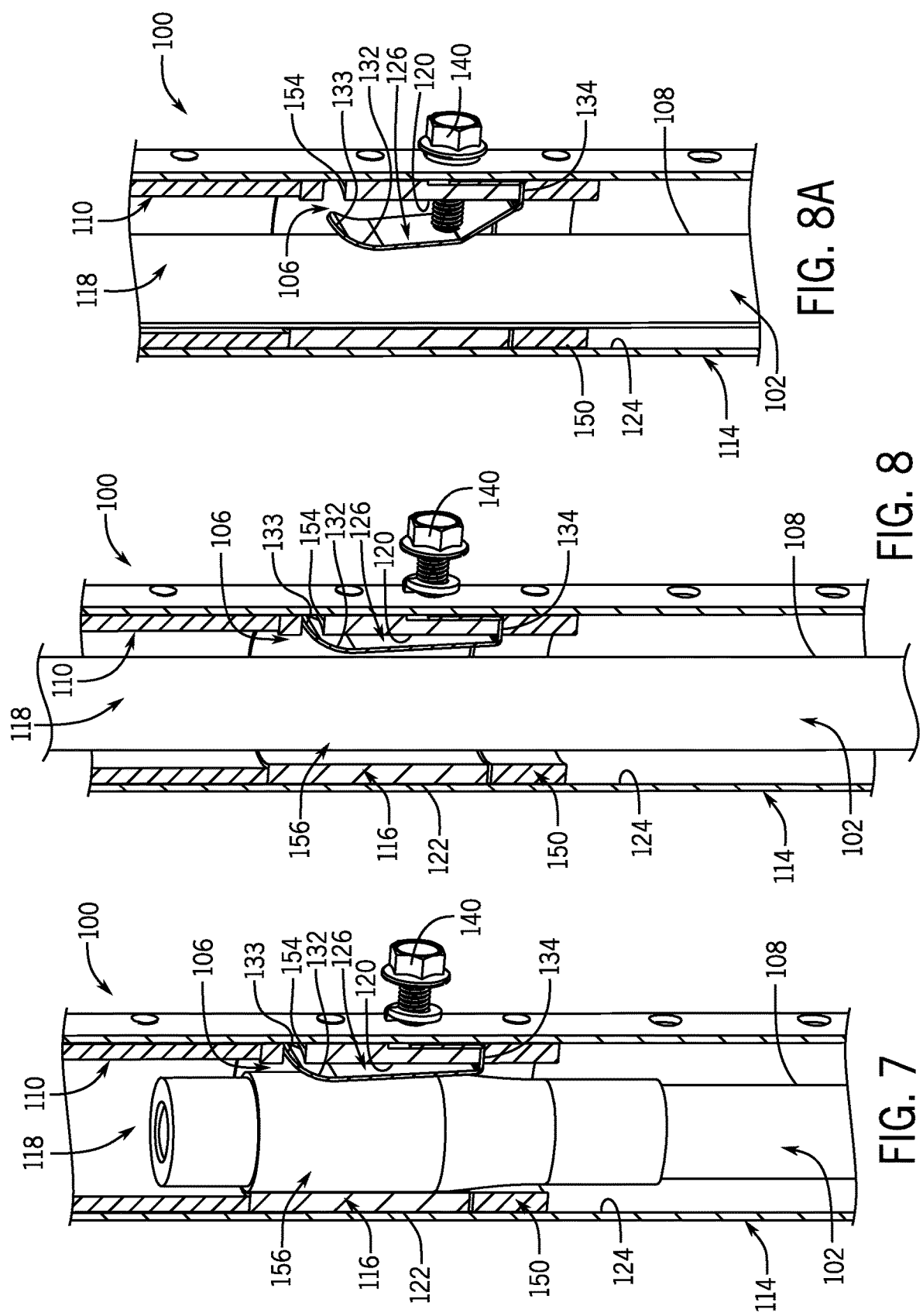

LIGHTNING PROTECTION SYSTEM AND METHOD

RELATED APPLICATIONS

This application claims priority under 35 U.S.C. § 119 to U.S. Provisional Patent Application No. 62/693,580 filed on Jul. 3, 2018, the entire contents of which is incorporated herein by reference.

BACKGROUND

In many applications, it may be useful to provide protection against lightning strikes using a lightning protection system. In some lightning protection systems, a down-conductor can provide an electrical connection to ground and can be arranged within a mast.

SUMMARY

Some embodiments of the invention include a lightning protection system with a mast assembly with an internal passageway that includes an internal surface. A conductor with a semi-conductive outer layer can extend through the internal passageway. A deflection member can be arranged at least partially within the internal passageway. The deflection member can be configured to deflect the conductor toward the internal surface so that the outer layer contacts the internal surface to form a conductive pathway between the mast assembly and the conductor.

Some embodiments of the invention include an equipotential bonding system for a lightning protection system that includes a mast assembly with a coupling assembly that includes an internal passageway defined by an internal surface, and a conductor that extends through the internal passageway. The equipotential bonding system can include a deflection member that is disposed at least partly within the internal passageway. The deflection member can be configured to urge the conductor into contact with the internal surface to form a conductive pathway between the mast assembly and the conductor.

Some embodiments of the invention include a method of forming an equipotential bonding system for a lightning protection system that includes an internal passageway, an internal surface, a deflection member, and a conductor that extends through the internal passageway. The deflection member can be disposed at least partly within the internal passageway to urge an outer layer of the conductor into contact with the internal surface, to form a conductive pathway between the mast assembly and the conductor via the internal surface.

DESCRIPTION OF THE DRAWINGS

FIG. 1 is a top, front, right cross-sectional partial view of a lightning protection system according to one embodiment of the present invention.

FIG. 2 is a front cross-sectional partial view of the lightning protection system of FIG. 1.

FIG. 7 is a front cross-sectional partial view of a lightning protection system according to one embodiment of the present invention, with a plug being inserted through a mast assembly.

FIG. 8 is a front cross-sectional partial view of a lightning protection system of FIG. 7 with a conductor arranged out of contact with the mast assembly.

FIG. 8A is a front cross-sectional partial view of the lightning protection system of FIG. 7 with the conductor biased into contact with the mast assembly.

DETAILED DESCRIPTION

Figure 4:
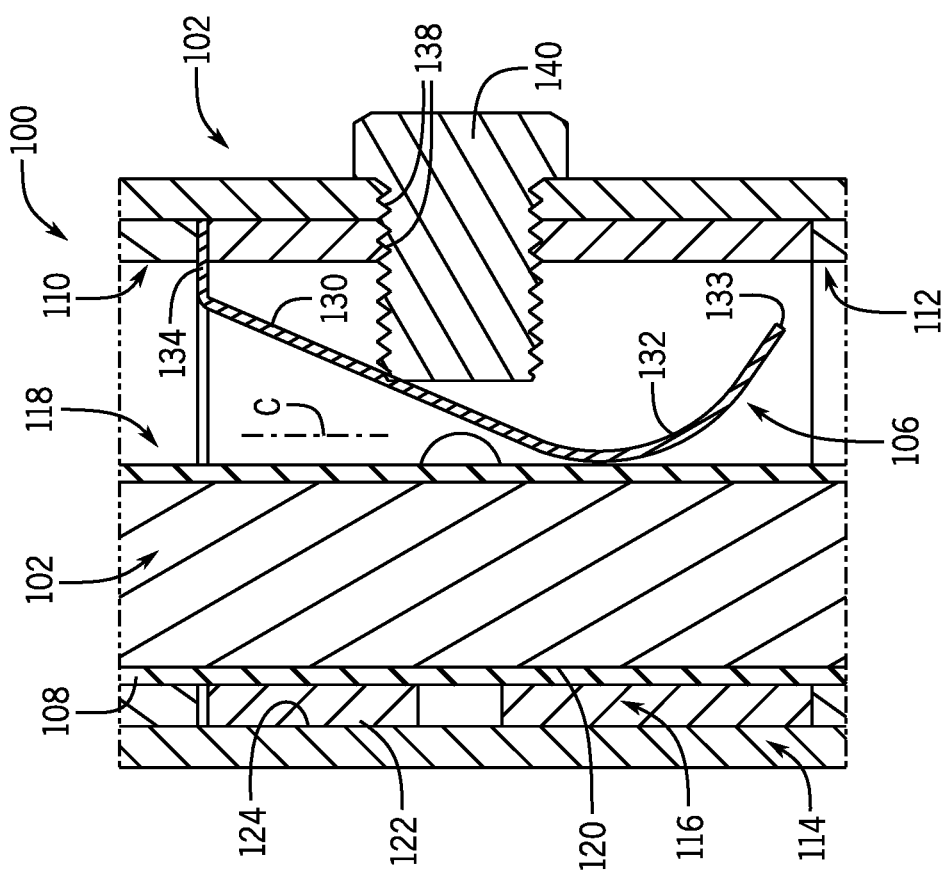
FIG. 4 is a cross-sectional partial view of the lightning protection system with the conductor biased into contact with a mast assembly, taken from a similar perspective as FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

The use herein of the term "separated" refers to features that are spaced apart from each other. For example, axially separated features of a component may be features that are spaced apart from each other along an axial direction. Unless otherwise specified or limited, use of the term "separated," is not intended to require any other particular alignment of features with respect to a referenced direction. For example, axially separated components may generally be spaced apart from each other relative to an axial direction, while being or not being disposed or otherwise aligned along a common axially extending reference line. Similarly, for example, radially separated components may generally be spaced apart from each other relative to a radial direction, while being separated from each other, or not separated from each other, relative to an axial direction. Similarly, for example, circumferentially separated components may generally be spaced apart from each other relative to a circumferential direction, while be separated from each other, or not separated from each other, relative to a radial direction or an axial direction.

Generally embodiments of the invention can provide a lightning protection system configured to form an equipotential bond between a conductor and a mast assembly. In some embodiments, the lightning protection system may include a deflection member arranged at least partially within or extending at least partially into the mast assembly to deflect the conductor into a portion of the mast assembly. In some embodiments, for example, the deflection member may define an elastic or otherwise biased (e.g., pre-biased) structure that, when the conductor is inserted axially through the mast assembly and the lightning protection system is assembled, is biased to deflect the conductor into contact with an inner surface of the mast assembly. In this way, for example, an equipotential bond can be formed between the mast assembly and an outer layer of the conductor.

In some embodiments, for example, the deflection member may be placed into engagement with the conductor upon assembly of the one or more components of the lightning protection system. For example, assembly of one or more components of the mast assembly may urge the deflection member into engagement with the conductor and the pre-biased or other elastic properties of the deflection member may ensure that an outer layer of the conductor is maintained in contact with an inner surface of the mast assembly. In some embodiments, for example, a fastening element (e.g., a threaded fastener) may be selectively installed at least partially through and into the mast assembly to contact a biasing element or the conductor, and thereby deflect an outer layer of the conductor into contact with an inner surface of the mast assembly. In this way, for example, an equipotential bond may be formed and maintained between the outer layer of the conductor and the inner surface of the mast assembly, when the lightning protection system is assembled.

FIGS. 1-4 illustrate a lightning protection system 100 according to one embodiment of the present invention. In the illustrated embodiment, for example, the lightning protection system 100 includes a conductor 102, a mast assembly 104 surrounding the conductor 102, and a deflection member 106. The conductor 102 can include an outer layer 108 that can be fabricated from a semi-conductive material. In general, the outer layer 108 can control an electric field surrounding the conductor 102, for example, near an upper termination (not shown) of the conductor 102 (i.e., an air terminal near a strike point of the lightning protection system 100). In operation, a portion of lightning electrical current can travel through the outer layer 108, and it may be desirable to direct this portion of lightning electrical current to ground. In some embodiments, for example, it may be desirable to ground the outer layer 108 of the conductor 102 at a distance from the strike point that is small relative to the length of the conductor 102.

Figure 3:
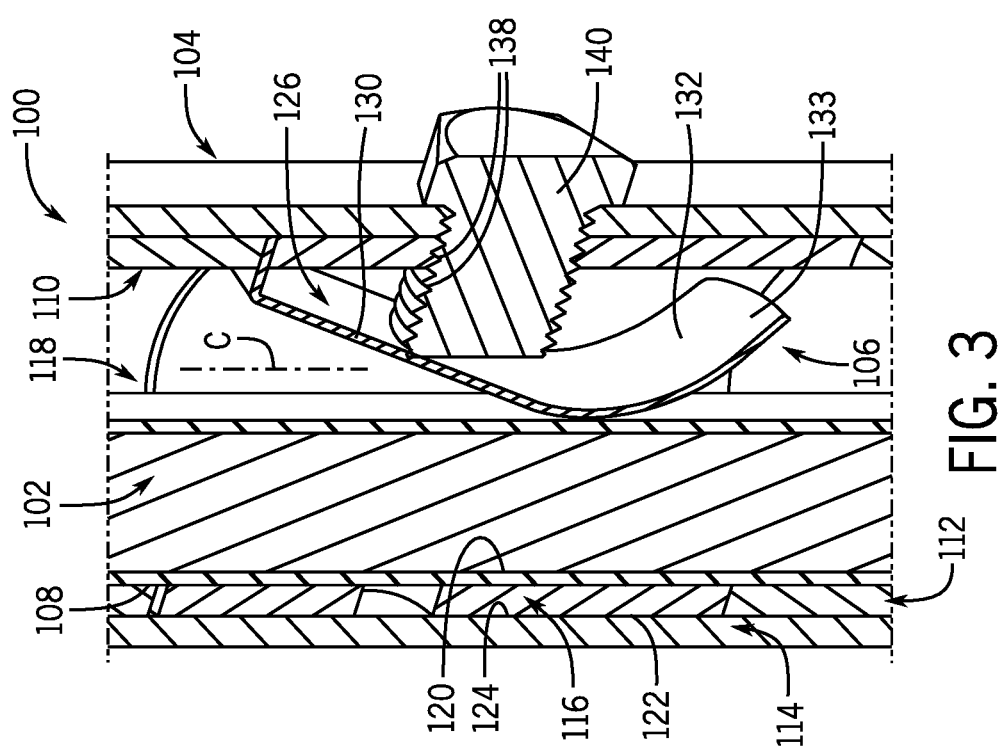
FIG. 3 is a cross-sectional partial view of the lightning protection system with a conductor biased into contact with a mast assembly, taken from a similar perspective as FIG. 1.

Generally, embodiments of the present invention can provide grounding of the outer layer 108 of the conductor 102 via contact with a portion of the mast assembly 104 that is facilitated by the deflection member 106 (see, e.g., FIGS. 3 and 4). In this way, for example, the lightning protection system 100 can form an equipotential bond between the outer layer 108 of the conductor 102 and the mast assembly 104 using a single contact point/area, without the need for an intermediate conductor(s) or multiple contact points, as used in some conventional systems.

In the illustrated embodiment, the mast assembly 104 includes a first mast section 110, a second mast section 112, and a mast coupler 114. The first mast section 110 and the second mast section 112 can be axially separated from one another with a mast insert 116 arranged axially therebetween. The first mast section 110, the second mast section 112, and the mast insert 116 may be arranged along a common central axis C and define an internal passageway 118 that extends axially along the mast assembly 104. In some embodiments, for example, the internal passageway 118 may be defined by an internal surface 120 that extends axially along each of the first mast section 110, the second mast section 112, and the mast insert 116.

In some embodiments, for example, the mast coupler 114 can be configured to mechanically couple the first mast section 110 to the second mast section 112. In the illustrated embodiment, the mast coupler 114 surrounds (e.g., encircles) the mast insert 116 and at least a portion of the first mast section 110 and the second mast section 112. In some embodiments, for example, when the mast coupler 114 is installed around the portions of the first and second mast sections 110 and 112 and the mast insert 116, an outer surface 122 (e.g., radially outer surface) of the mast insert 116 can contact an inner surface 124 (e.g., radially inner surface) of the mast coupler 114. In this way, for example, an electrical connection may be established between the mast insert 116 and the mast coupler 114.

With reference to FIGS. 1-4, the deflection member 106 can be arranged at least partially within the internal passageway 118 and can be configured to deflect (e.g., bias) the outer layer 108 of the conductor 102 toward the internal surface 120. In this way, for example, the deflection member 106 can be configured to provide a predetermined (or customizable) amount of force onto the conductor 102 to force the outer layer 108 into contact with the internal surface 120 and form an equipotential bond between the outer layer 108 of the conductor 102 and the mast insert 116, and thereby the mast coupler 114 via the electrical connection therebetween.

In the illustrated embodiment, the deflection member 106 can be in form of a plate, such as a plate 126 formed into a clip that includes one or more tabs 128, an angled portion 130, a curved portion 132, an end 133, and a mounting portion 134. In some embodiments, for example, the plate 126 can be fabricated from an electrically conductive, or semi-conductive, metal material. In some embodiments, for example, the plate 126 can be fabricated from an electrically insulating (i.e., non-conductive) material. In some embodiments, for example, the plate 126 can be fabricated as a unitary component (i.e., manufactured from a single piece of material).

Where the deflection member 106 is fabricated from an electrically conductive, or semi-conductive, metal material, it can create an additional electrically conductive path from the outer layer 108 of the conductor 102 to the mast insert 116, and to thereby the mast coupler 114, via the electrical connection therebetween. Such electrically conductive path can exist in addition to, rather than as a replacement of, the conductive path formed by contact between the outer layer 108 of the conductor 102 and the mast assembly 104, as facilitated by the deflection member 106.

Figure 6:
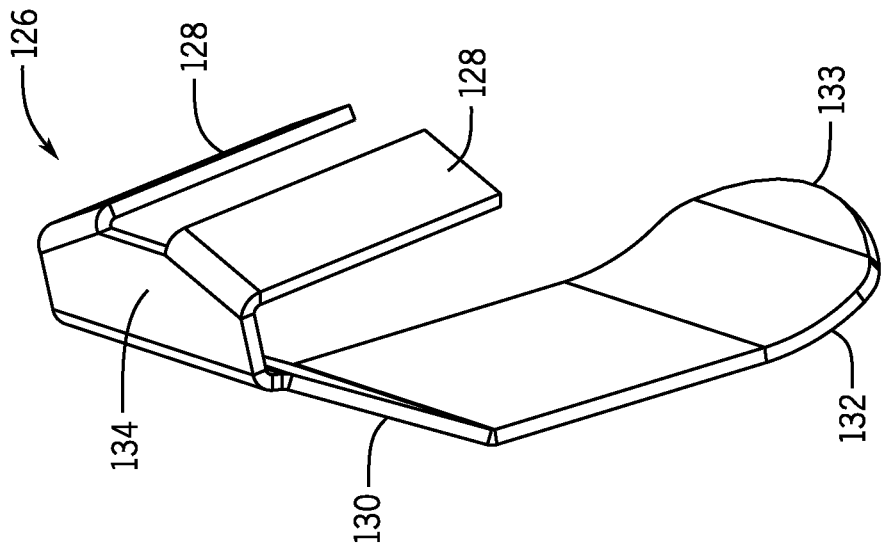
FIG. 6 is a top, front, right isometric view of a deflection member of the lightning protection system of FIG. 1.

As illustrated in FIG. 6 in particular, the plate 126 includes two tabs 128 that extend away from the angled portion 130. For example, when assembled (see FIGS. 1-4), the angled portion 130 may extend in a direction toward the central axis C in order to contact the conductor 102 (as also discussed below). In some embodiments, for example, the tabs 128 may be angled or arced to conform to the profile of the outer surface 122 of the mast insert 116. The mounting portion 134 may be arranged between the tabs 128 and the angled portion 130, and the curved portion 132 may extend from a junction between the angled portion 130 and the curved portion 132 to the end 133 of the plate 126.

In the illustrated embodiment, the curved portion 132 defines a generally convex profile, at a surface facing the conductor 102. In some embodiments, for example, the angled portion 130 and/or the curved portion 132 can be shaped differently to otherwise provide a spring-like bias to force the outer layer 108 of the conductor 102 into contact with the internal surface 120. For example, a portion of the plate 126 that extends into the internal passageway 118 and is configured to contact the conductor 102 may be shaped in various ways, such that a moment is generated, upon contact with the conductor 102, and a corresponding deflecting force is generated in a direction toward the internal surface 120.

Figure 5:
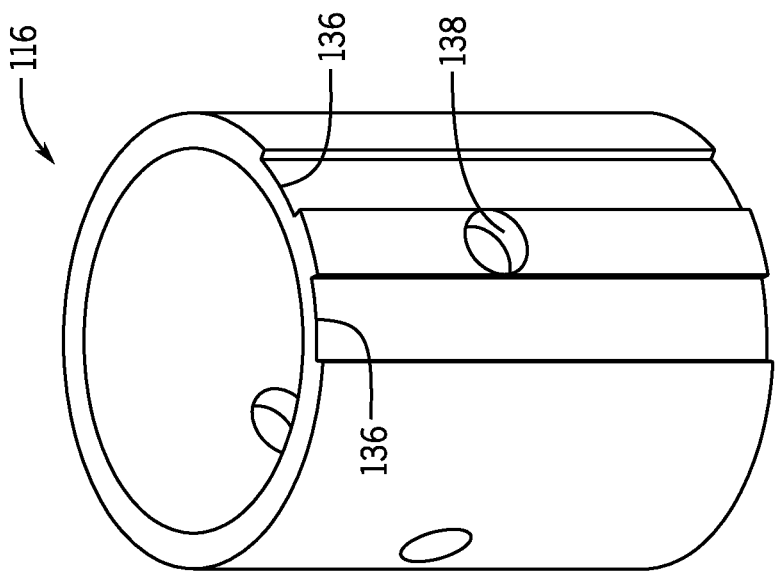
FIG. 5 is a top, front, right isometric view of a mast insert of the lightning protection system of FIG. 1.

In some embodiments, the mast insert 116 can include one or more recessed slots 136 formed in the outer surface 122. As illustrated in FIG. 5 in particular, for example, two of the slots 136 are provided, each corresponding to a different one of the tabs 128. The slots 136 can be radially recessed into the outer surface 122 and extend axially along a length of the mast insert 116. Each of the slots 136 can be dimensioned to receive a corresponding one of the tabs 128 therein, when the lightning protection system 100 is assembled, to help secure the plate 126 within the mast assembly 104. A threaded (or otherwise configured) aperture 138 can extend radially through each of the mast insert 116 and the mast coupler 114. In the illustrated embodiment, the threaded aperture 138 is arranged at a circumferential location between the slots 136 of the mast insert 116. In this way, for example, a fastening element 140 may be aligned to engage the deflection member 106, upon being inserted, or threaded, through the threaded aperture 138. In some non-limiting examples, the fastening element 140 may be in the form of a screw or bolt.

As generally illustrated in FIGS. 1 and 2, to assemble the lightning protection system 100, for example, the plate 126 can be arranged relative to the mast insert 116, so that the tabs 128 of the plate 126 generally align with or extend at least partially into the slots 136 of the mast insert 116. The mast insert 116 and the plate 126 may be arranged axially between opposing ends of the first mast section 110 and the second mast section 112, so that the first mast section 110, the second mast section 112 and the mast insert 116 are aligned along the central axis C. The mast coupler 114 can then be installed around the mast insert 116 and at least a portion of the first mast section 110 and the second mast section 112. In this way, for example, the tabs 128 can be pressed, or sandwiched, between the outer surface 122 of the mast insert 116 and the inner surface 124 of the mast coupler 114 to axially secure the plate 126 within the internal passageway 118. In some embodiments, for example, a section of one or both of the first mast section 110 and the second mast section 112 may be secured to the mast coupler 114 (e.g., via a rivet or another securing mechanism) to prevent the mast coupler 114 from displacing axially relative to the first and second mast sections 110 and 112.

With the plate 126 secured within the internal passageway 118, the conductor 102 may be inserted axially along the internal passageway 118. In some embodiments, for example, the plate 126 may provide sufficient flexibility and/or clearance to enable the conductor 102 to axially pass thereby in both directions. Once the conductor 102 is installed within the internal passageway 118, the fastening element 140 can be inserted through the threaded aperture 138 to press against the angled portion 130 of the plate 126. In this way, for example, the plate 126 can be forced toward the conductor 102, which can thereby force the conductor 102 toward the internal surface 120. The contact between the outer layer 108 and the internal surface 120 can thereby form an equipotential bond between the outer layer 108 and the mast coupler 114, which can facilitate the grounding of lightning current within the outer layer 108.

In some embodiments, the most substantial conductive pathway from the conductor 102 for equipotential bonding can be provided by contact between the conductor 102 and the mast insert 116 (or other parts of the coupler in general). In some embodiments, a degree of conductive contact for equipotential bonding can be provided by contact between the conductor 102 and the plate 126 or a fastener that is similarly positioned.

In some implementations, the fastening element 140 may be tightened to a predetermined torque to prevent it from loosening. This predetermined torque may also provide a predetermined (and customizable) amount of force on the conductor 102 via the plate 126. The force on the conductor 102 may be a combination of a force from the fastening element and a spring-like force generated by bending the plate 126. Generally, the force on the conductor 102 can be sufficient to deflect the outer layer 108 of the conductor 102 into contact with the internal surface 120 and maintain the contact therebetween (see, e.g., FIGS. 3 and 4).

In some embodiments, for example, a plate may be designed with a sufficient predetermined spring-like force to deflect and maintain the outer layer 108 into contact with the internal surface 120, without the added force of a fastening element, such as the fastening element 140. In this regard, for example, an insert or other holding element for the plate 126 may be formed with or without an aperture for a fastener, and the resiliency of the plate 126 alone may appropriately ground the conductor 102 against the mast assembly 104.

In some embodiments, for example, a fastening element may be used to deflect the outer layer 108 against the internal surface 120, without the use of a plate, such as the plate 126. In these embodiments, for example, a predetermined amount of torque may be applied to the fastening element 140 that will provide an appropriate resultant amount of force on the conductor 102.

In some embodiments, for example, a lock nut (not shown) may be tightened against the outer surface of the mast coupler 114 in order to maintain the force against the conductor 102 and prevent the fastening element 140 from loosening. In some embodiments, for example, the fastening element 140 may be in the form of a shear bolt that is configured to shear off at a predetermined torque magnitude.

In some embodiments, the arrangement or orientation of the components within the lightning protection system 100 can be varied to accommodate alternative mounting configurations. Alternatively or additionally, a distance that the deflection member 106 is allowed to travel relative to the center axis C can be extended by arranging one or more slots or cutouts within the mast insert 116. In some embodiments, for example, the one or more slots or cutouts can be axially aligned with the end 133 of the deflection member 106, and extend radially at least partially into the inner surface 120 of the mast insert 116 to allow the end 133 of the deflection member 106 to be received at least partially therein.

FIGS. 7-8A illustrate another embodiment of the lightning protection system 100 according to the present invention. As illustrated in FIGS. 7-8A, a vertical orientation (e.g., from the perspective of FIGS. 1-4 and 7-8a) can be reversed. That is, the deflection member 106 can extend in an upward direction (i.e., from the perspective of FIGS. 7-8A), and a second mast section may be in the form of a deflection member insert 150. The deflection member insert 150 can be installed within the inner surface 124 of the mast coupler 114 along the center axis C. When the lightning protection system 100 is assembled as illustrated in FIGS. 7-8A, the mounting portion 134 of the plate 126 can be pressed, or sandwiched, between the deflection member insert 150 and the mast insert 116 to axially secure the plate 126 within the internal passageway 118.

Figure 9:
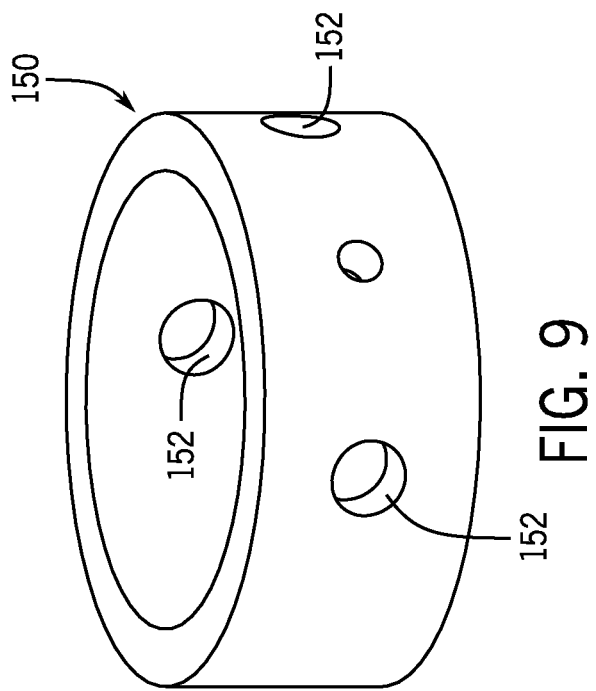
FIG. 9 is a top, front, right isometric view of a deflection member insert of the lightning protection system of FIG. 7.

As illustrated in FIG. 9, the deflection member insert 150 can define a generally annular shape and include one or more deflection apertures 152 arranged circumferentially around the deflection member insert 150. Each of the deflection apertures 152 may extend radially through the deflection member 150. In some embodiments, one or more of the deflection apertures 152 can align with corresponding apertures (see, e.g., FIGS. 7-8a) on the mast coupler 114. In some non-limiting examples, the deflection member insert 150 can be secured to the mast coupler 114 (e.g., via a rivet or another securing mechanism inserted through the deflection aperture 152 and the corresponding aperture formed in the mast coupler 114) to prevent the deflection member insert 106 from displacing axially relative to the mast insert 116 and the mast coupler 114.

Figure 10:
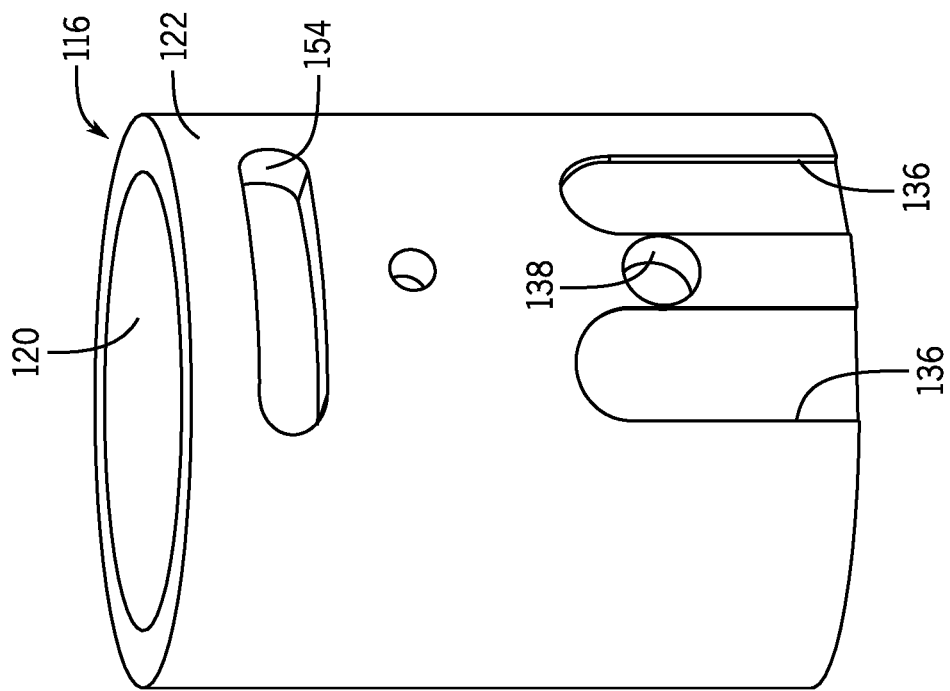
FIG. 10 is a top, front, right isometric view of a mast insert of the lightning protection system of FIG. 7.

As illustrated in FIG. 10, in some embodiments, the slots 136 of the mast insert 116 can extend axially along a portion of outer surface 122 of the mast insert 116. For example, the slots 136 may extend axially from one axial end of the mast insert 116 to a location between the axial end and an opposing axial end of the mast insert 116. In the illustrated non-limiting example, the mast insert 116 includes a cutout 154 that extends radially through the mast insert 116 (i.e., through the internal surface 120 and the outer surface 122). The cutout 154 can extend circumferentially around a portion of the mast insert 116 and may be generally circumferentially aligned with the slots 136. That is, in some embodiments, for example, the slots 136 and the cutout 154 may be centered circumferentially with respect to one another. In this way, for example, the slots 136 may align a tip of the end 133 of the plate 126 with the cutout 154. In some embodiments, the cutout 154 can define an axial height that facilitates the tip to be at least partially received within the cutout 154.

As generally illustrated in FIGS. 7-8A, to assemble the lightning protection system 100, for example, the plate 126 can be arranged relative to the mast insert 116, so that the tabs 128 of the plate 126 generally align with or extend at least partially into the slots 136 of the mast insert 116. The mast insert 116 and the plate 126 may be arranged axially between opposing ends of the first mast section 110 and the deflection member insert 150, so that the first mast section 110, the mast insert 116, and the deflection member insert 150 are aligned along the central axis C. The mast coupler 114 can then be installed around the mast insert 116 and at least a portion of the first mast section 110 and the deflection member insert 150. In this way, for example, the tabs 128 can be pressed, or sandwiched, between the outer surface 122 of the mast insert 116 and the inner surface 124 of the mast coupler 114 to axially secure the plate 126 within the internal passageway 118.

With the plate 126 secured within the internal passageway 118, the conductor 102 may be inserted axially along the internal passageway 118. In some embodiments, for example, the plate 126 may provide sufficient flexibility and/or clearance to enable the conductor 102 to axially pass thereby in both directions. For example, as illustrated in FIG. 7 in particular, the conductor 102 may include an end, or a plug, 156 that defines a greater diameter than the other portions of the conductor 102. As the plug 156 is axially inserted past the plate 126, the plate 126 may flex toward the interior surface 120 of the mast insert 116 (i.e., in a direction away from the center axis C) and the cutout 154 may at least partially receive the end 133 of the plate 126. In this way, for example, the plate 126 may be allowed to flex toward the interior surface 120 a greater distance compared to a configuration of the mast insert 116 without the cutout 154 and to provide a correspondingly greater clearance for passage of conductors or other objects through the mast insert 116.

Once the plug 156 has moved past the plate 126 and the mast insert 116, the conductor 102 may be arranged within the internal passageway 118 with the outer layer 108 arranged to be potentially out of contact with the internal surface 120 of the mast assembly (see, e.g., FIG. 8). When desired, the fastening element 140 can be inserted through the threaded aperture 138 to press against the angled portion 130 of the plate 126. In this way, for example, the plate 126 can be forced toward the conductor 102, which can thereby force the conductor 102 toward the internal surface 120 and into contact therewith (see, e.g., FIG. 8a). The contact between the outer layer 108 and the internal surface 120, as established and maintained by the plate 126 (and the fastening element 140), can thereby form an equipotential bond between the outer layer 108 and the mast coupler 114, which can facilitate the grounding of lightning current within the outer layer 108. Although use of an adjustable fastening element can be advantageous, including in the configuration of FIGS. 7-8A, other approaches are possible. For example, some plates can be configured to bias a conductor against a side wall of a mast based on only internal elastic response.

Figure 11:
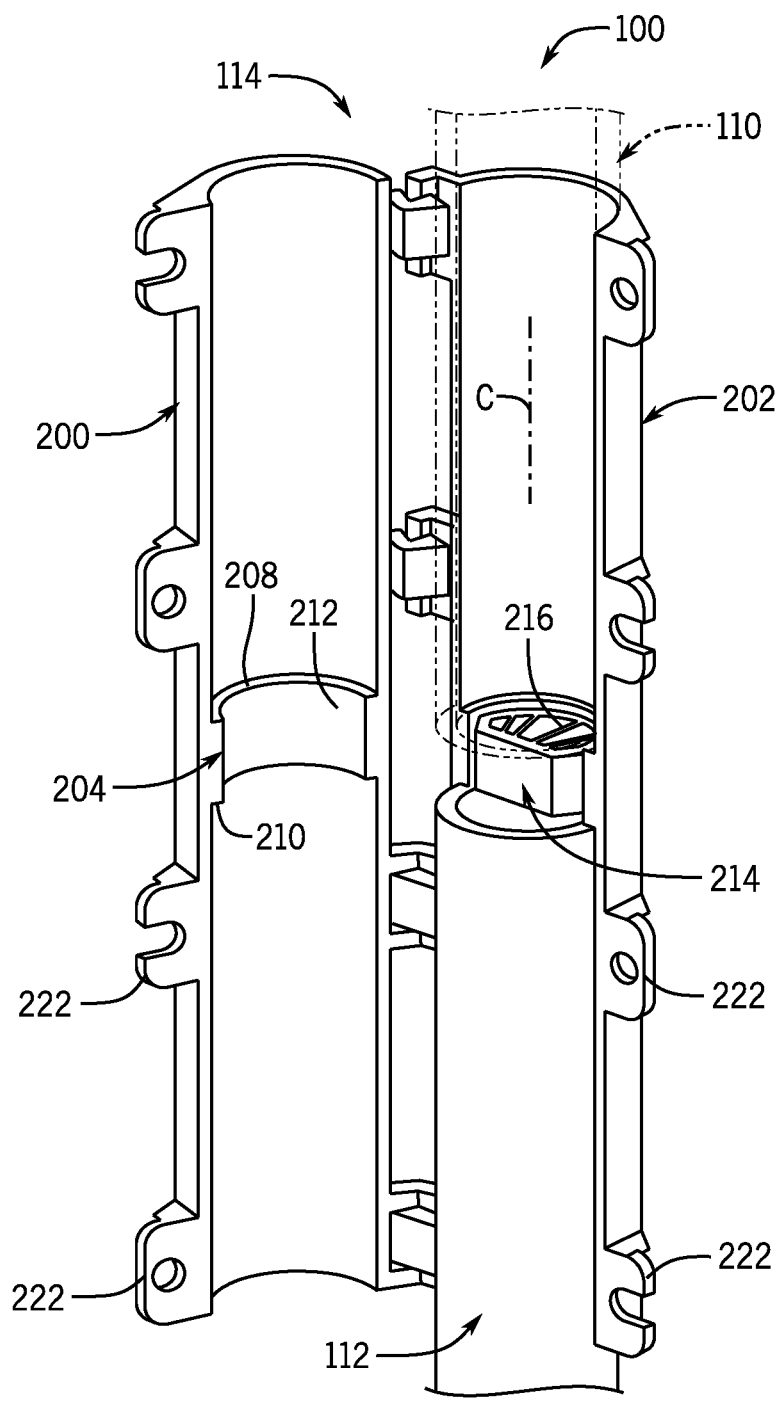
FIG. 11 is a top, front, right isometric view of a lightning protection system according to another embodiment of the present invention, with a coupler of the lightning protection system in an open configuration.
Figure 12:
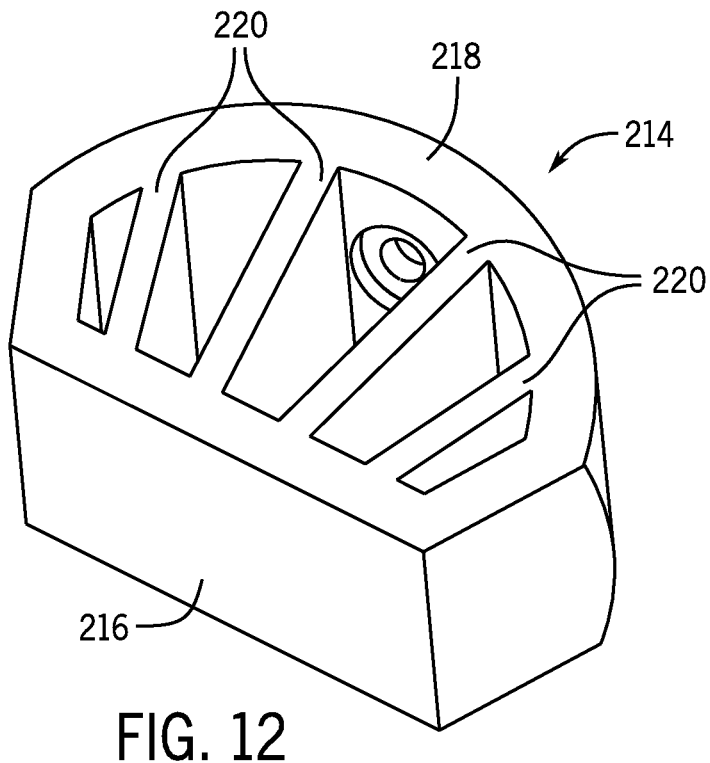
FIG. 12 is a top, front, right isometric view of an elastic insert of the lightning protection system of FIG. 11.
Figure 13:
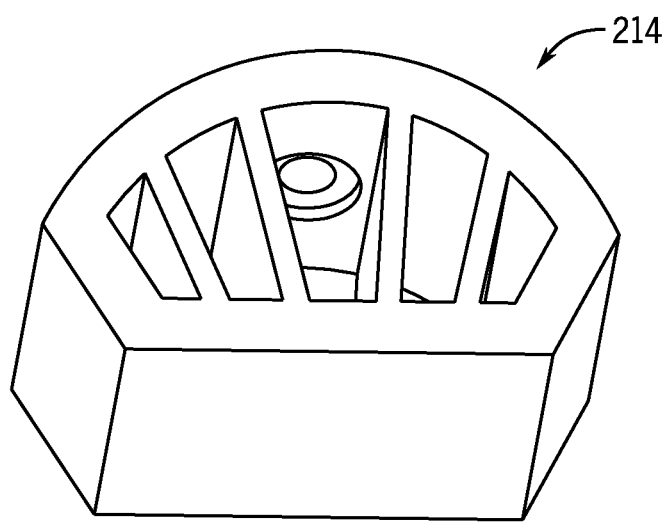
FIG. 13 is a top, front, left, isometric view of the elastic insert of FIG. 12.

FIGS. 11-13 illustrate another embodiment of the lightning protection system 100 according to the present invention. As illustrated in FIGS. 11-13, the mast coupler 114 may define a general clam-shell structure, with a first coupler section 200 and a second coupler section 202 that are hingedly coupled to one another. The coupler sections 200, 202 can accordingly be hinged open to receive the mast sections 110, 112, then closed to secure the mast sections 110, 112, a conductor (not shown in FIGS. 11-13), and a deflection member therein.

In the embodiment illustrated, each of the first coupler section 200 and the second coupler section 202 includes a ledge 204 that protrudes radially inward from an inner coupler surface 206 to form an annular internal collar within the mast coupler 114. The ledge 204 can include a first ledge surface 208, a second ledge surface 210, and an internal surface 212. The first ledge surface 208 and the second ledge surface 210 can extend radially inward from the inner coupler surface 206 and the internal surface 212 can extend axially between the radially-inward ends of the first and second ledge surfaces 208 and 210.

In the illustrated embodiment, the deflection member is in the form of an elastic insert 214 that is configured to be arranged axially between opposing ends of the first mast section 110 and the second mast section 112. When assembled, for example, the elastic insert 214 may be axially aligned with the ledge 204 of the mast coupler 114, which can help to appropriately align and secure the elastic insert 214 within the mast coupler 114, as well as to ensure appropriate compression of the elastic insert 214 (as also discussed below).

As illustrated in FIGS. 12 and 13 in particular, in the illustrated embodiment, the elastic insert 214 includes a biasing wall 216, a coupler wall 218, and a webbing formed from a plurality of fins 220 that extend between the biasing wall 216 and the coupler wall 218. As illustrated in FIG. 11 in particular, the biasing wall 216 can be configured to engage the conductor 102 (not shown in FIG. 11) when the conductor 102 extends through the mast coupler 114. The coupler wall 218 can be configured to conform to a profile corresponding by the internal surface 212, so as to fit securely within the mast coupler 114 once installed.

In different embodiments, different types of structures can be provided to ensure appropriate deflection of a conductor. In the illustrated embodiment, for example, the elastic insert 214 defines a generally webbed structure, with a generally hollow space that is enclosed by the biasing wall 216 and the coupler wall 218 and that is interrupted by the plurality of fins 220. Upon compression at the biasing wall 216, the fins 220 and the biasing wall 216 can accordingly provide a resilient, biasing response force.

In some embodiments, for example, the elastic insert may be fabricated from a polymer. In some embodiments, for example, the elastic insert can be formed from a rubber (or other) extrusion which is then cut to an appropriate length. In general, the elastic properties of the elastic insert 214 can enable the elastic insert 214 to provide a spring-like force on the conductor 102, for example, due to deformation of the elastic insert 214 upon engagement with the conductor 102.

In some embodiments, for example, an elastic insert such as the elastic insert 214 can be fabricated from a conductive, or semi-conductive polymer. In this regard, for example, the elastic insert can create an additional electrically conductive path from the outer layer of a conductor to the mast assembly. Such electrically conductive path can exist in addition to, rather than as a replacement of, the conductive path formed by contact between the outer layer of the conductor and the mast assembly.

As illustrated in FIG. 11 in particular, to assemble the lighting protection system 100 of FIGS. 11-13, for example, the first and second sections 202 and 204 of the mast coupler 114 may be opened and the first mast section 110 may be inserted therein so that the first ledge surface 208 support an end of the first mast section 110. The second mast section 112 may be inserted into an opposing end of the mast coupler 114, so that the second ledge surface 210 is supported against an end of the second mast section 112. With the first and second mast sections 110 and 112 at least partially arranged within the mast coupler 114, the elastic insert 214 may be arranged axially between the first and second mast sections 110 and 112, with the biasing wall 216 arranged substantially parallel with a split plane (i.e., a plane that aligns with a split between the first coupler section 200 and the second coupler section 202) defined by the mast coupler 114. In this way, for example, the biasing wall 216 can be arranged to generate a deflecting force against the conductor 102 in a direction toward the internal surface 212 of the first coupler section 200, upon closing the mast coupler 114.

Once the elastic insert 214 is arranged within the mast coupler 114 (or at other times), the conductor 102 (not shown in FIG. 11) may be inserted axially along the internal passageway 118. In some embodiments, for example, the elastic insert 214 may provide sufficient flexibility and/or clearance to enable the conductor 102 to axially pass thereby in both directions. Once the conductor 102 is installed within the internal passageway 118, the mast coupler 114 may be closed and the first coupler section 200 may be secured to the second coupler section 202. In this way, for example, the internal surface 212 of the mast coupler 114 can engage the conductor 102 and force the conductor 102 into engagement with the elastic insert 214. Correspondingly, the elastic properties of the elastic insert 214 can then provide a spring-like force that acts to deflect the outer layer 108 of the conductor 102 into contact with the internal surface 212, opposite the elastic insert 214, and maintain the contact therebetween. Accordingly, the contact between the outer layer 108 and the internal surface 212 can form an equipotential bond between the outer layer 108 and the mast coupler 114, which can facilitate the grounding of lightning current within the outer layer 108.

In the embodiment illustrated, the coupler sections 200, 202 can be secured in a closed configuration (not shown) using a set of protruding ears 222 that are provided with open slots and closed threaded holes on alternating sides of the coupler sections 200, 202. In other embodiments, other configurations are possible.

In other embodiments, other configurations are possible. In some embodiments, for example, a mast coupler may define a continuous sleeve arranged around the first and second mast sections 110 and 112, with a discrete door that may be selectively opened and closed. In these embodiments, for example, the elastic insert 214 can be attached to the door or arranged within the mast coupler (e.g., opposite the door). In this way, for example, upon closing the door, the internal surface 212 may be brought into engagement with the conductor 102 and the elastic insert 214 may deflect the outer layer 108 into contact with the internal surface 212 and maintain the contact therebetween.

Thus embodiments of the invention can provide improved systems for establishing equipotential bonding for lightning protection systems. In some embodiments, for example, a system for equipotential bonding can be manufactured and installed relatively easily, with a deflecting member configured to automatically (or otherwise) ensure that an appropriate conductive path is established between a conductor and a larger grounding system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. An equipotential bonding system for a lightning protection system comprising:
    a mast assembly with an internal passageway that includes an internal surface;
    a conductor that includes an outer layer and extends through the internal passageway; and
    a deflection member disposed at least partially within the internal passageway, the deflection member being configured to deflect the conductor toward the internal surface so that the outer layer contacts the internal surface to form a conductive pathway between the mast assembly and the conductor.

2. The equipotential bonding system of claim 1, wherein the deflection member includes a biasing plate that extends into the internal passageway and is contoured to bias the outer layer into contact with the internal surface.

3. The equipotential bonding system of claim 1, wherein the mast assembly includes a first mast section, a second mast section, and a mast coupler arranged around at least a portion of the first mast section and the second mast section, the mast coupler being configured to mechanically couple the first mast section to the second mast section; and
    wherein the deflection member is secured to the mast assembly to extend within the mast coupler.

4. The equipotential bonding system of claim 3, wherein the deflection member includes a fastening element that is threaded through the mast coupler to extend at least partially into the internal passageway.

5. The equipotential bonding system of claim 3, wherein the deflection member includes an elastic insert arranged within the mast coupler between the first mast section and the second mast section.

6. The equipotential bonding system of claim 5, wherein the elastic insert defines a webbed structure having a plurality of fins extending between a biasing wall and a coupler wall.

7. The equipotential bonding system of claim 5, wherein the mast coupler is a hinged mast coupler.

8. The equipotential bonding system of claim 6, wherein the elastic insert is fabricated from a polymer.

9. The equipotential bonding system of claim 3, wherein the first mast section and the second mast section are separated from one another by a mast insert that is disposed within the mast coupler between the first mast section and the second mast section and that includes the internal surface.

10. The equipotential bonding system of claim 9, wherein the deflection member includes a biasing plate that extends into the internal passageway and is contoured to bias the outer layer into contact with the internal surface.

11. The equipotential bonding system of claim 10, wherein the biasing plate includes one or more tabs received within a corresponding one or more recessed slots formed in an outer surface of the mast insert, the one or more tabs being sandwiched between the outer surface of the mast insert and an inner surface of the mast coupler.

12. The equipotential bonding system of claim 10, wherein the mast insert includes a cutout configured to receive at least a portion of the biasing plate therein.

13. The equipotential bonding system of claim 12, wherein the cutout is configured to receive the portion of the biasing plate to permit deflection of the biasing plate from a first configuration to a second configuration, the second configuration providing greater clearance within the internal passageway than the first configuration.

14. The equipotential bonding system of claim 10, wherein the second mast section is in the form of a deflection member insert and a mounting portion of the biasing plate is pressed between the deflection member insert and the mast insert.

15. A method of forming an equipotential bonding system for a lightning protection system that includes a mast assembly with an internal passageway, an internal surface, a deflection member, and a conductor that extends through the internal passageway, the method comprising:
    disposing the deflection member at least partly within the internal passageway to urge an outer layer of the conductor into contact with the internal surface, to form a conductive pathway between the mast assembly and the conductor via the internal surface.

16. The method of claim 15, wherein the deflection member includes a biasing plate; and
    wherein disposing the deflection member at least partly within the internal passageway includes securing the biasing plate at a mast coupler that includes the internal passageway.

17. The method of claim 16, wherein securing the biasing plate at the mast coupler includes securing the biasing plate with an insert that is secured within the mast coupler between first and second mast sections of the mast assembly.

18. The method of claim 17, wherein securing the biasing plate with the insert includes inserting a tab of the biasing plate into a slot disposed between the insert and the mast coupler.

19. The method of claim 18, wherein inserting the tab disposes at least one of an angled portion or a curved portion of the biasing plate to engage the conductor.

* * * * *